US005903719A

United States Patent [19]

Yamamoto

[11] Patent Number: 5,903,719

[45] Date of Patent: May 11, 1999

[54] EMULATOR APPARATUS AND EMULATION METHOD FOR EFFICIENTLY ANALYZING PROGRAM FAULTS

[75] Inventor: Hiroshi Yamamoto, Hyogo, Japan

[73] Assignees: Mitsubishi Electric Semiconductor Software Co., Ltd., Hyogo; Mitsubishi Denki Kabushiki, Tokyo, both of Japan

[21] Appl. No.: 08/905,350

[22] Filed: Aug. 4, 1997

[30] Foreign Application Priority Data

Feb. 27, 1997 [JP] Japan .................................... 9-043746

[51] Int. Cl.[6] ...................................................... G06F 11/00

[52] U.S. Cl. ................................ 395/183.14; 395/183.21; 395/184.01

[58] Field of Search ............................... 395/183.14, 500, 395/183.01, 183.05, 184.01, 183.04, 183.21, 183.06, 183.19; 364/230.3

[56] References Cited

U.S. PATENT DOCUMENTS

| | | | |
|---|---|---|---|
| 5,608,867 | 3/1997 | Ishihara | 395/184.01 |
| 5,689,636 | 11/1997 | Kleber et al. | 395/183.21 |
| 5,758,059 | 5/1998 | Alexander | 395/183.06 |

FOREIGN PATENT DOCUMENTS

| | | |
|---|---|---|
| 57-155652 | 9/1982 | Japan . |
| 1226032 | 9/1989 | Japan . |
| 2-31241 | 2/1990 | Japan . |

*Primary Examiner*—Hassan Kizou
*Assistant Examiner*—Abu Hossain
*Attorney, Agent, or Firm*—Leydig, Voit & Mayer

[57] ABSTRACT

An emulation apparatus is connected to a host computer and a target system for verifying the operation of a program written for the target system. A microcomputer in the emulation apparatus executes the program written for the target system. In an undo mode, the execution of a program is halted at the end of the execution of each instruction. At that time, information on relative bus cycles is stored in a relative-bus cycle area of a memory. The contents of data and control registers in a target system are acquired and stored in data-register and control-register areas.

4 Claims, 3 Drawing Sheets

11 MICROCOMPUTER
13
16 BUS CONTROL CIRCUIT
EMULATION MEMORY 12
17 COMMUNICATION INTERFACE
15 MONITOR CIRCUIT
14 TRACE CIRCUIT
18 TRACE MEMORY
TO COMMUNICATION CABLE 32

EMULATOR APPARATUS AND EMULATION METHOD FOR EFFICIENTLY ANALYZING PROGRAM FAULTS

BACKGROUND OF THE INVENTION

1. Field of the Invention

The present invention relates to an emulator apparatus and an emulation method that are capable of preserving pieces of information stored in registers and a memory on each execution of an instruction and allows a program fault to be analyzed with a high degree of efficiency.

2. Description of the Prior Art

FIG. 1 is a diagram showing the configuration of a conventional support system used in development of a program to be executed in a target system controlled by a microcomputer. Reference numeral 31 shown in the figure is a host computer. Reference numeral 33 is an emulator apparatus used as a support system for locating and correcting (i.e., debugging) errors in the program. As shown in the figure, the emulator apparatus 33 is connected to the host computer 31 by a communication cable 32. With the emulator apparatus 33, a written program can be executed without writing the program in a ROM. If a result of the execution of the program by means of a program execution function indicates that a target system denoted by reference numeral 34 does not work correctly, it is necessary to locate an error of the program and correct the error. Examples of the target system 34 which employs a microcomputer are a copy machine and an air conditioner. Reference numeral 35 is a probe for connecting the target system 34 to the emulator apparatus 33. Reference numeral 36 is a hard-disk unit for storing data of the host computer 31 and reference numeral 37 is a communication cable for exchanging data between the host computer 31 and the hard-disk unit 36.

The support system shown in FIG. 1 works as follows. First of all, a user invokes a piece of software known as debug software in the host computer 31 which is used for controlling the emulator apparatus 33. That is to say, the emulator apparatus 33 is controlled by the user by operating the debug software. It should be noted that, prior to the use of the emulator apparatus 33, the host computer 31 is used for developing programs.

For the reader's information, a procedure for developing a program is explained as follows.

First of all, in the development of a program to be executed on a microprocessor, the program is written in a formal language called a programming language. A program is written typically by using a word-processor (available in the market) run on the host computer 31. The written program is stored in a data file of the word-processor. Then, the program stored in the data file is converted by translating software known as a compiler or an assembler into machine-language information which can be executed readily by the microprocessor. The compiler is a software tool running on the host computer 31. The compiler reads out the written program from the data file of the word-processor as input data and creates the machine-language information as output data which represents the written program.

As described above, the emulator apparatus 33 is connected to the host computer 31 by the communication cable 32 for transmitting a command issued by the host computer 31 to the emulator apparatus 33 and exchanging data between the host computer 31 and the emulator apparatus 33. Also as described above, the emulator apparatus 33 is on the other hand connected to the target system 34 by the probe 35, one end of which is plugged into a socket for the microprocessor on the board of the target system 34.

Next, an internal circuit of the conventional emulator apparatus is explained by referring to a diagram showing the configuration of the internal circuit.

FIG. 2 is a diagram showing the configuration of the conventional emulator apparatus. Reference numeral 11 shown in the figure is a microcomputer and reference numeral 12 is an emulation memory unit for storing program information received from the host computer 31 by way of a communication interface unit 17 and a monitor circuit 15. Reference numeral 14 is a trace circuit for monitoring information on a system bus 13 through a bus control circuit 16 and for forming a judgment as to whether or not a bus access satisfying a trace condition set in advance by the monitor circuit 15 is made. If a bus access satisfying a trace condition is detected, the trace circuit 14 notifies the monitor circuit 15 of the fact that a trace condition is satisfied. The bus control circuit 16 is a central circuit for controlling the other blocks in the emulator apparatus 33. The bus control circuit 16 interprets a command issued by a user by way of the host computer 31 and carries out processing requested by the command. Reference numeral 18 is a trace memory unit for storing trace information when receiving a signal requesting preservation of the trace information from the trace circuit 14.

The emulator apparatus operates as follows. First of all, information on a program received from the host computer 31 by way of the communication interface unit 17 and the monitor circuit 15 is stored in the emulation memory unit 12. Next, when trace information is to be preserved, the user sets a trace condition in the trace circuit 14 in advance prior to the execution of the program stored in the emulation memory unit 12. Then, the program is executed by the microcomputer 11 which is used for emulation purposes. As a signal requesting preservation of trace information is received from the trace circuit 14, the trace memory unit 18 stores the trace information. The trace circuit 14 monitors information on a system bus 13 through the bus control circuit 16, forming a judgment as to whether or not a bus access satisfying a trace condition set in advance by the monitor circuit 15 is made. If a bus access satisfying a trace condition is detected, the trace circuit 14 notifies the monitor circuit 15 of the fact that a trace condition is satisfied.

Since the conventional emulator apparatus has the configuration described above, trace information preserved in the trace memory unit 18 comprises only data and control signals flowing through the system bus 13. Records of changes in contents of data and control registers of the CPU in the target system 34 are not preserved.

For this reason, even though the contents of a memory of the CPU in the target system 34 can be restored, it is impossible to restore the contents of data registers and control registers. As a result, once an instruction has been executed, a state prior to the execution of the instruction can not be restored.

It is thus necessary to analyze trace information by visual observation in order to locate an error of a program, giving rise to a problem that it takes a lot of time to locate and correct the program error.

In addition, in the case of an emulator apparatus 33 with no trace function, it is necessary to search a program for the location of an error by step execution. In this case, however, when it is desired to return to a prior state before re-execution can be carried out, it is necessary to execute the program from the beginning. As a result, such an emulator apparatus 33 also has a problem that it takes a lot of time to locate and correct an error of the program.

SUMMARY OF THE INVENTION

The present invention addresses the problems described above. It is thus an object of the present invention to provide an emulator apparatus that allows an error of a program to be located and corrected with ease.

In order to achieve the object described above, according to a first aspect of the present invention, there is provided an emulator apparatus wherein:

a microcomputer enters an undo mode for stopping execution of a program at the end of execution of each instruction of the program;

program information is received from a host computer and stored in an emulation memory unit;

a trace circuit forms a judgment as to whether or not a bus access satisfying a trace condition set in advance by a monitor circuit is made;

if it is found that a bus access satisfying a trace condition was made, the result of the judgment is output to the monitor circuit; and if a signal requesting the preservation of trace information is received from the trace circuit, the trace information is stored in a trace memory unit whereas data stored in a RAM unit of a target system, information on relative bus cycles from the start of the data preservation, and the contents of data registers and control registers employed in a CPU in the target system are stored in a preservation memory unit.

The configuration of the emulator apparatus described above results in an effect that an error of a program can be located and corrected with ease.

According to a second aspect of the present invention, there is provided an emulator apparatus wherein:

a microcomputer enters an undo mode; data stored in a RAM unit of a target system is transferred to a RAM-data area of a preservation memory unit;

execution of a program on the target system is halted at the end of execution of each instruction of the program;

information on relative bus cycles is stored in a relative-bus-cycle area of the preservation memory unit; and contents of data registers and control registers of the target system are acquired and stored in the preservation memory unit;

when a command to reflect information on a history of execution is entered from a host computer, data stored in the preservation-memory unit is set in the microcomputer as the most recent contents of the data registers and control registers thereof;

the trace memory is then searched by using information on relative bus cycles stored in the relative-bus-cycle area of the preservation memory unit;

if there is a record indicating that contents at the address of a location of a memory the RAM unit employed in the target system were updated during the execution of instructions in the bus cycles, a retroactive search of a history of execution starting from the address is carried out;

if a record indicating a write access to an address is found, the written value is reflected to the address at which data was modified;

if a record indicating a write access to an address is not found in the trace memory, on the other hand, the RAM-data area of the preservation memory unit is searched for the data of the address in question which was stored in the RAM-data area as an initial value for the address; and the initial value is then reflected to the address at which data was modified.

The configuration of the emulator apparatus described above results in an effect that an error of a program can be located and corrected with ease.

According to a third aspect of the present invention, there is provided an emulator apparatus wherein:

a monitor circuit monitors a system bus;

if a write access to a memory unit is detected in execution of an instruction, a value written to the memory unit as well as the contents of data registers and control registers are transmitted to the host computer having a preservation memory unit comprising a RAM-data area, a data-register area, a control-register area and a memory-address/data area which are used for storing a history of execution; and in restoration of a history of execution, data stored in the preservation memory of the host computer is reflected to the target system.

As a result, the emulator apparatus exhibits an effect that an error of a program can be located and corrected with ease without adding a new configuration.

According to a fourth aspect of the present invention, there is provided an emulation method comprising the steps of:

switching to an undo mode for halting execution of a program at the end of execution of each instruction of the program;

carrying out processing requested by a command;

receiving program information from the host computer by way of a monitor circuit and storing the program information in an emulation memory unit;

forming a judgment as to whether or not a bus access satisfying a trace condition set in advance by the monitor circuit is made and, if it is found that a bus access satisfying the trace condition was made, outputting the result of the judgment to the monitor circuit;

storing trace information in a trace memory unit when receiving a signal requesting preservation of trace information; and preserving data stored in a RAM unit employed in the target system, information on relative bus cycles from the start of preservation of trace information, contents of data registers of a CPU in the target system and contents of control registers of the CPU in a preservation memory unit in case of receiving the signal requesting the data preservation of trace information.

As a result, the emulator method exhibits an effect that an error of a program can be located and corrected with ease.

BRIEF DESCRIPTION OF THE DRAWINGS

The above and other objects, features as well as many of attendant advantages of the present invention will be readily appreciated as the same becomes better understood from a study of detailed description of preferred embodiments of the present invention given below with reference to the following figures showing embodiments in which.

DETAILED DESCRIPTION OF THE PREFERRED EMBODIMENTS

Preferred embodiments of the present invention will be described in detail with reference to the accompanying diagrams showing the embodiments.

First Embodiment

Figure 3:
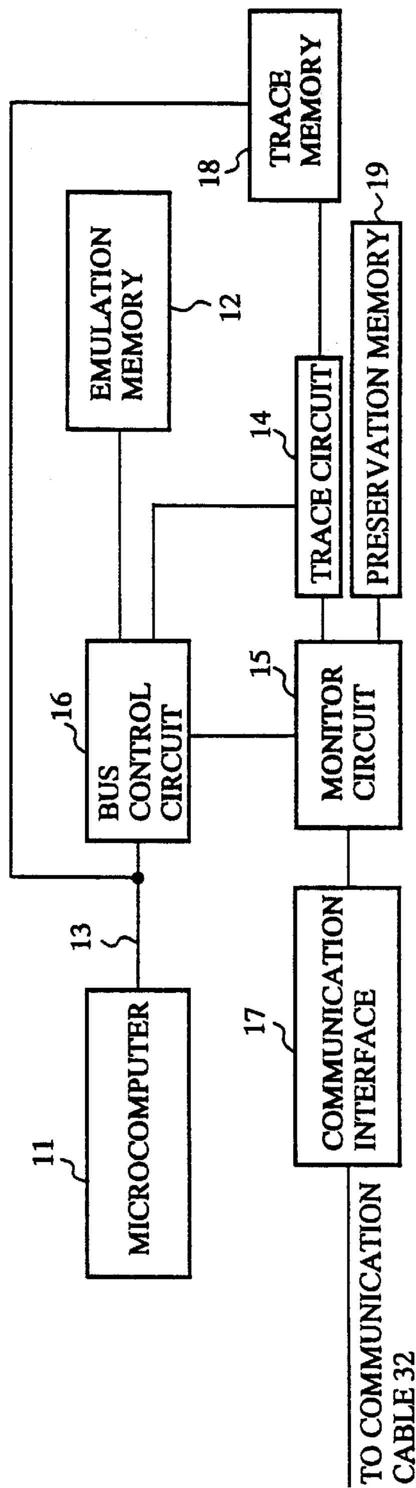
FIG. 3 is a diagram showing the configuration of an emulator apparatus as implemented by a first embodiment of the present invention.
Figure 4:
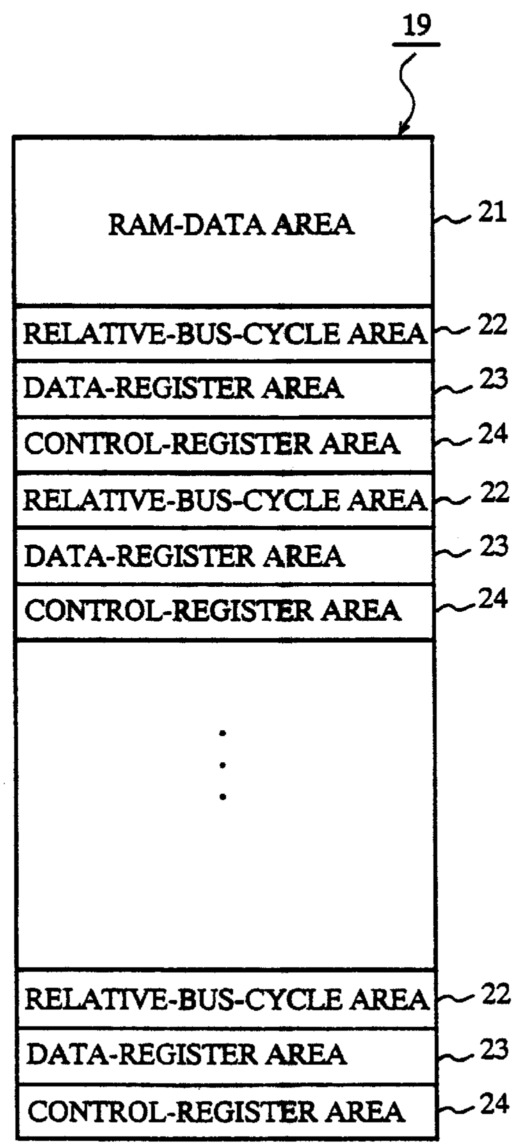
FIG. 4 is a configuration diagram showing the concept of a preservation memory unit employed in the emulator apparatus implemented by the first embodiment of the present invention.

FIG. 3 is a diagram showing the configuration of an emulator apparatus as implemented by a first embodiment of the present invention, and FIG. 4 is a configuration diagram showing the concept of a preservation memory unit employed in the emulator apparatus implemented by the first embodiment. Reference numeral 11 shown in the figure is a microcomputer, and reference numeral 12 is an emulation memory unit for storing program information received from the host computer 31 by way of a communication interface unit 17 and a monitor circuit 15. Reference numeral 14 is a trace circuit for monitoring information on a system bus 13 through a bus control circuit 16 and for forming a judgment as to whether or not a bus access satisfying a trace condition set in advance by the monitor circuit 15 is made. If a bus access satisfying a trace condition is detected, the trace circuit 14 notifies the monitor circuit 15 of the fact that a trace condition is satisfied. The bus control circuit 16 is a central circuit for controlling the other blocks in the emulator apparatus 33. The bus control circuit 16 interprets a command issued by a user by way of the host computer 31 and carries out processing requested by the command.

Reference numeral 19 is a preservation memory unit added to the emulator apparatus 33. As shown in FIG. 4, the preservation memory unit 19 comprises a RAM-data area 21 for preserving data stored in a RAM unit employed in a target system 34, a relative-bus-cycle area 22 for storing information on relative bus cycles from a preservation-start point of time, a data-register area 23 for storing contents of data registers of a CPU in the target system 34, and a control-register area 24 for storing contents of control registers of the CPU.

The emulator apparatus 33 works in a debug operation as follows. A step execution function is used to execute a program by executing only one instruction at a time. In this way, since the program is executed step by step, the operation of the target system 34, execution addresses of the program, and so on can be verified, and thereby errors of the program can be located.

First of all, a method of preserving information on a history of execution during the execution of a program is explained.

To begin with, a command to preserve information on a history of execution is output from the emulator control software of the host computer 31 to the emulator apparatus 33. Receiving this command, the emulator apparatus 33 enters an undo mode, restoring the target system 34 from the present state of a history of execution experienced by the program to a state prior to the execution. Then, data stored in the RAM unit employed in the target system 34 is transferred to the RAM-data area 21 of the preservation memory unit 19. In the undo mode, an operation to acquire trace information is started.

In order to acquire trace information, in the first place, the program is executed on the target system 34 by halting the execution of the program at the end of the execution of each instruction instead of executing the program on a real-time basis even if continuous execution is requested. When the execution of the program is halted at the end of an instruction, information on relative bus cycles associated with the instruction is stored in the relative-bus-cycle area 22 of the preservation memory unit 19. Then, a register-value referencing function of the emulator apparatus 33 is used to acquire the contents of data registers and control registers of the CPU in the target system 34. The contents of the data registers and control registers are then stored in the data-register area 23 and the control-register area 24 of the preservation memory unit 19 respectively. As the emulator apparatus 33 receives a command to terminate the operation to acquire information on an execution history from the emulator control software, the operation to obtain trace information is ended. After the command to terminate the operation to acquire information on an execution history, the continuous execution of the program is carried out on a real-time basis without storing the contents of the data registers and control registers in the preservation memory unit 19.

Next, a procedure for reflecting a history of execution to the target system is explained.

First of all, a command to reflect information on a history of execution is output from the emulator control software to the emulator apparatus 33. Receiving the command, the emulator apparatus 33 uses a register setting function to set data stored in the data-register area 23 and the control-register area 24 of the preservation-memory unit 19 in the microcomputer 11 as the most recent contents of the data and control registers thereof. Then, the trace memory 18 is searched by using information on relative bus cycles stored in the relative-bus-cycle area 22 of the preservation memory unit 19.

If there is a record indicating that contents at the address of a location of a memory (the RAM unit) employed in the target system 34 were updated during the execution of instructions in the bus cycles, a retroactive search of a history of execution starting from the address is carried out. If a record indicating a write access to an address is found, the written value is reflected to the address at which data was modified. If a record indicating a write access to an address is not found in the trace memory 18, on the other hand, the RAM-data area 21 of the preservation memory unit 19 is searched for the data of the address in question which was stored in the RAM-data area 21 as an initial value for the address. The initial value is then reflected to the address at which data was modified. When the operation to reflect data is completed, the information on the history of execution, the data of which has been reflected, is deleted from the preservation memory unit 19.

As described above, according to the first embodiment, the trace memory 18 is searched by using information on relative bus cycles stored in the relative-bus-cycle area 22 of the preservation memory unit 19. If there is a record indicating that contents at the address of a location of the memory (RAM unit) employed in the target system 34 were updated during the execution of instructions in the bus cycles, a retroactive search of a history of execution starting from the address is carried out. If a record indicating a write access to an address is found, the written value is reflected to the address at which data was modified. In this way, the emulator apparatus 33 exhibits an effect that an error of a program can be located and corrected with ease.

Second Embodiment

Figure 1:
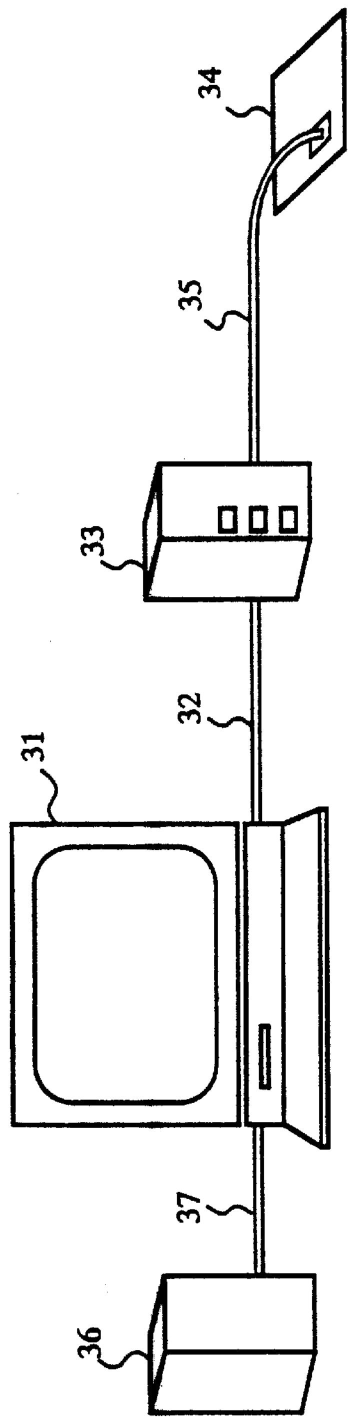
FIG. 1 is a block diagram showing the configuration of a conventional support system used in development of a program to be executed on a microcomputer.
Figure 5:
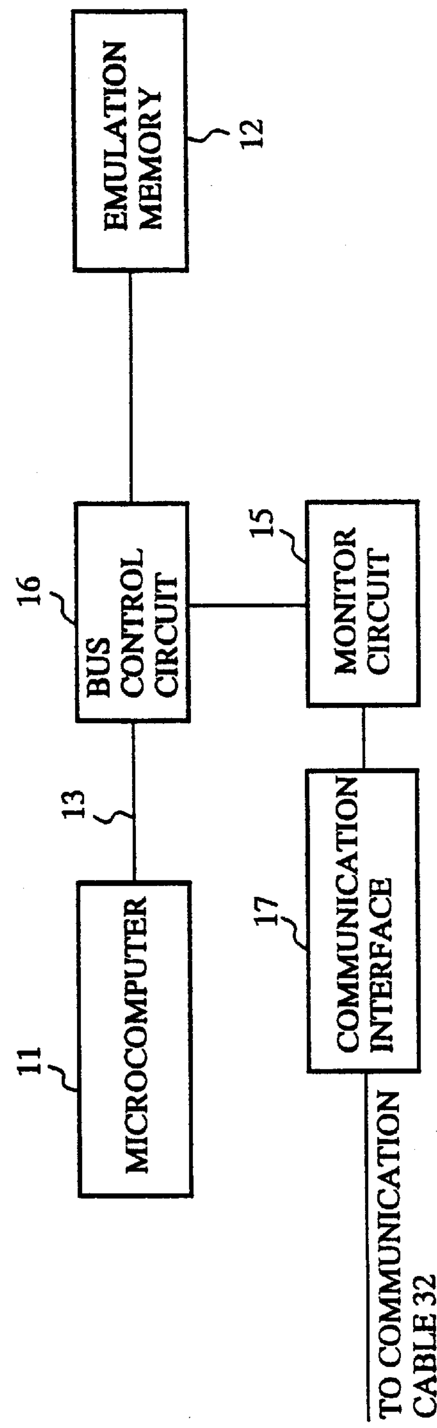
FIG. 5 is a diagram showing the configuration of an emulator apparatus as implemented by a second embodiment of the present invention.
Figure 2:
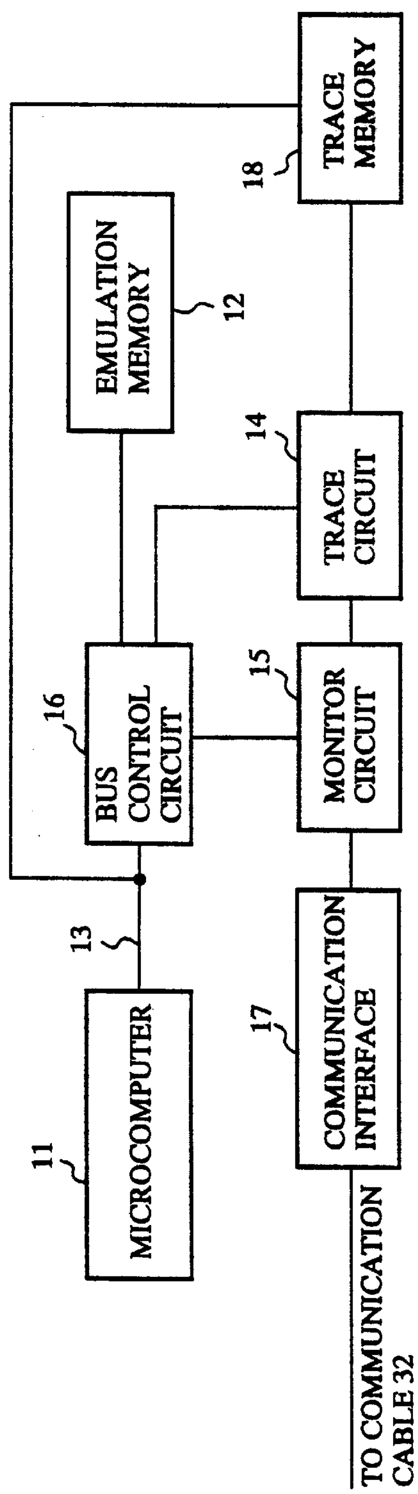
FIG. 2 is a diagram showing the configuration of the conventional emulator apparatus.
Figure 6:
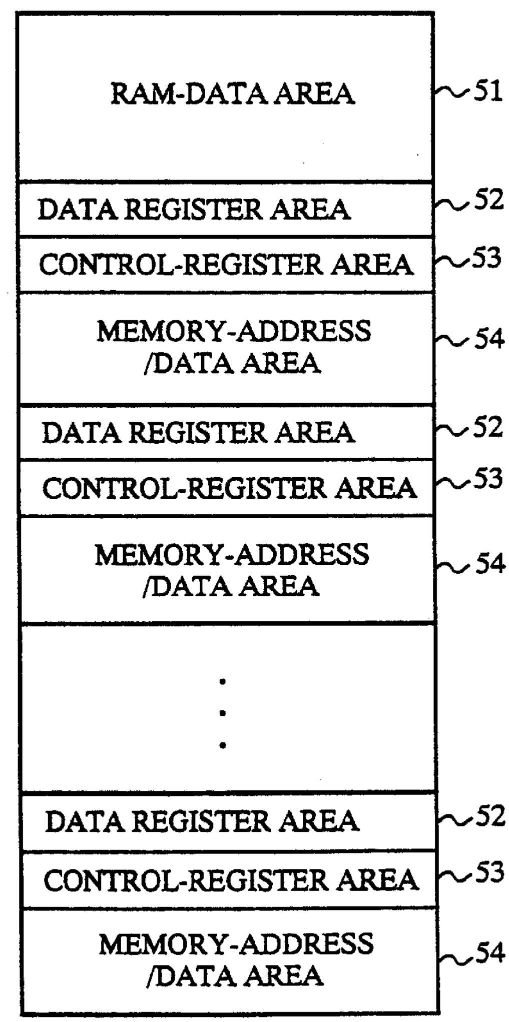
FIG. 6 is a configuration diagram showing the concept of a preservation memory unit employed in the emulator apparatus implemented by the second embodiment of the present invention.

FIG. 5 is a diagram showing the configuration of an emulator apparatus as implemented by a second embodiment of the present invention, and FIG. 6 is a configuration diagram showing the concept of a preservation memory unit employed in the emulator apparatus implemented by the second embodiment. Components of FIG. 5 denoted by the same reference numerals used in FIG. 3 are identical with or equivalent to the corresponding components employed in the first embodiment and, thus, their explanation is omitted. In the case of the first embodiment, the trace circuit 14, the trace memory unit 18 and the preservation memory unit 19 are employed in the emulator apparatus 33. In the case of the second embodiment, on the other hand, their functions are incorporated in the host computer 31, resulting in a simpler configuration of the emulator apparatus 33.

The emulator apparatus works as follows. First of all, each address of the memory (the RAM unit) experiencing a write access and the written data thereof are added as data to be preserved. For this reason, during the operation to preserve information on a history of execution, the emulator apparatus 33 monitors the system bus 13 by means of the monitor circuit 15. If a write access to the memory is detected in execution of an instruction, a value written to the memory as well as the contents of the data registers and control registers are transmitted to the host computer 31 by way of the communication cable 32. Then, the emulator control software in the host computer 31 stores the history of execution in a RAM-data area 51, a data-register area 52, a control-register area 53 and a memory-address/data area 54 of a memory of the host computer 31 which is used as a preservation memory unit. In restoration of a history of execution, the data stored in the memory of the host computer 31 which is used as a preservation memory unit is transmitted to the emulator apparatus 33 by way of the communication cable 32 to be reflected to the target system 34.

As described above, according to the second embodiment, the memory of the host computer 31 is used as a preservation memory unit for storing information on a history of execution with a format shown in FIG. 6. As a result, the emulator apparatus exhibits an effect that an error of a program can be located and corrected with ease without adding a new configuration.

Third Embodiment

In the case of the second embodiment, only the memory of the host computer 31 is used as a preservation memory unit as described above. In the case of the third embodiment, on the other hand, by storing information on a history of execution in the-hard-disk unit 36, the size of the memory employed in the host computer 31 which is used as a preservation memory unit can be reduced. In addition, the third embodiment exhibits an effect that a larger amount of information on a history of execution than that storable in the memory of the host computer 31 can be stored in the hard-disk unit 36.

It should be noted that, while the present invention has been described with reference to the first to third illustrative embodiments, the description is not intended to be construed in a limiting sense. That is to say, it is to be understood that the subject matter encompassed by the present invention is not limited to the three embodiments. It will be apparent to persons skilled in the art upon a study of the description that a variety of changes and modifications of the embodiments can be made without deviating from the spirit and scope of the present invention. It is therefore contemplated that the appended claims will cover any such changes and modifications which are made within the true scope of the present invention.

What is claimed is:

1. An emulator apparatus connected to a host computer and a target system by communication cables for executing a program developed for the target system, wherein if the target system does not work correctly, a built-in function can be used to locate and correct an error in the program, the emulator apparatus comprising:

- a microcomputer for entering an undo red mode for halting execution of the program at the end of execution of each instruction of the program when a command to preserve information on a history of execution is received from the host computer;
- a monitor circuit for interpreting a command issued by the host computer and performing processing requested by the command;
- an emulation memory for receiving program information from the host computer through the monitor circuit and storing the program information;
- a trace circuit for monitoring information on a system bus through a bus control circuit and forming a judgment as to whether a bus access satisfying a trace condition set in advance by the monitor circuit is made and, if a bus access satisfying the trace condition was made, outputting a result of the judgment to the monitor circuit;
- a trace memory for storing trace information when receiving a signal requesting preservation of trace information from the trace circuit; and
- a preservation memory comprising a RAM-data area for preserving data stored in a RAM unit in the target system, a relative-bus-cycle area for storing information on relative bus cycles from the start of preservation, a data-register area for storing contents of data registers of a CPU in the target system and a control-register area for storing contents of control registers of the CPU responsive to the signal requesting preservation of trace information from the trace circuit.

2. The emulation apparatus according to claim 1 wherein the microcomputer has data preserving means responsive to a command to preserve information on a history of execution from the host computer and data reflecting means responsive to a command to reflect history data from the host computer, the data preserving means comprising:

- means for setting an undo mode used for restoring the target system to a state prior to execution of the program;
- means for transferring data stored in the RAM unit employed in the target system to the RAM-data area of the preservation memory and halting execution of the program at the end of execution of each instruction of the program and storing information on relative bus cycles associated with execution of the instruction in the relative-bus-cycle area of the preservation memory; and means for acquiring contents of the data and control registers of the target system using a register-value referencing function and storing the contents of the data and control registers in the data-register and control-register area of the preservation memory, respectively, the data reflecting means comprising:

means for setting data stored in the data-register area and the control-register area of the preservation memory in the CPU as most recent contents of the data and control registers thereof;

means for searching the trace memory by using information on relative bus cycles stored in the relative-bus-cycle area of the preservation memory, retroactively searching a history of execution starting from an address of a location of a memory the RAM unit in the target system if there is a record indicating that contents at the address were updated during the execution of instructions in the bus cycles and reflecting a written value to the address at which data was modified if a record indicating a write access to an address is found; and means for searching the RAM-data area of the preservation memory for data of an address in question which was stored in the RAM-data area as an initial value for the address and reflecting the initial value to the address at which data was modified if a record indicating a write access to the address is not found in the trace memory.

3. A test system for debugging a program developed for a target system including data and control registers, the test system comprising:

a host computer including a preservation memory having a RAM data area, a data register area, and a control register area for storing information on a history of execution of the program:

an emulator connected to the host computer and a target system by communication cables for executing a program developed for the target system and for locating and correcting an error in the program if the target system does not work correctly, the emulator including:

a monitor circuit for monitoring a system bus and detecting a write access to a memory of the target system, wherein if the write access to the memory is detected in execution of an instruction, a value to be written to the memory and contents of data and control registers are transmitted to the preservation memory of the host computer, and wherein in restoration of a history of execution, data stored in the preservation memory of the host computer is reflected to the target system.

4. An emulation method for an emulator apparatus connected to a host computer and a target system by communication cables wherein a program developed for the target system is executed and, if the target system does not work correctly, a built-in function can be used to locate and correct an error in the program, the method comprising:

switching to an undo mode for halting execution of the program at the end of execution of each instruction of the program when receiving a command to preserve information on a history of execution from the host computer;

interpreting a command issued by the host computer and performing processing requested by the command using a monitor circuit;

receiving program information from the host computer through the monitor circuit and storing the program information in an emulation memory;

monitoring information on a system bus through a bus control circuit and forming a judgment as to whether a bus access satisfying a trace condition set in advance by the monitor circuit is made and, if a bus access satisfying the trace condition is made, outputting a result of the judgment to the monitor circuit;

storing trace information in a trace memory when receiving a signal requesting preservation of trace information; and preserving data stored in a RAM unit in the target system in a RAM-data area of a preservation memory, storing information on relative bus cycles from the start of preservation of trace information in a relative-bus-cycle area of the preservation memory, storing contents of data registers of a CPU in the target system in a data-register area of the preservation memory and storing contents of control registers of the CPU in a control-register area of the preservation memory when receiving the signal requesting preservation of trace information.

* * * * *

UNITED STATES PATENT AND TRADEMARK OFFICE

CERTIFICATE OF CORRECTION

PATENT NO. : 5,903,719

DATED : May 11, 1999

INVENTOR(S) : HIROSHI YAMAMOTO

It is certified that error appears in the above-identified patent and that said Letters Patent is hereby corrected as shown below:

On the title page:

Item [73], Assignees, after "Kabushiki" insert --Kaisha--.

Column 8, line 23, delete "red".

Signed and Sealed this

Thirtieth Day of November, 1999

Attest:

Q. TODD DICKINSON

Attesting Officer

Acting Commissioner of Patents and Trademarks